United States Patent [19]

Rutz et al.

[11] Patent Number: 5,063,011

[45] Date of Patent: Nov. 5, 1991

[54] DOUBLY-COATED IRON PARTICLES

[75] Inventors: Howard Rutz, Newtown, Pa.; Francis G. Hanejko, Marlton, N.J.

[73] Assignee: Hoeganaes Corporation, Riverton, N.J.

[21] Appl. No.: 365,186

[22] Filed: Jun. 12, 1989

[51] Int. Cl.⁵ ........................ H01F 1/06; B29C 43/02; B29C 45/00

[52] U.S. Cl. .................................... 264/126; 148/105; 148/257; 252/62.54; 264/319; 264/328.1; 264/328.17; 264/DIG. 58; 427/214; 427/216; 428/407

[58] Field of Search ............... 148/105, 256, 257, 253; 428/407; 427/213, 214, 216; 264/109, 126, 319, 328.1, 328.17, DIG. 58; 252/62.54, 62.55, 62.56

[56] References Cited

U.S. PATENT DOCUMENTS

| | | | |
|---|---|---|---|
| 1,789,477 | 1/1931 | Roseby | 252/62.54 |
| 1,850,181 | 3/1932 | Roseby | 148/104 |
| 2,232,352 | 4/1937 | Verweij | 427/127 |
| 2,783,208 | 2/1957 | Katz | 148/105 |
| 3,480,485 | 11/1969 | Hart et al. | 148/257 X |
| 3,933,536 | 1/1976 | Doser et al. | 148/105 |
| 3,935,340 | 1/1976 | Yamaguchi et al. | 427/216 |
| 3,953,251 | 4/1976 | Butherus et al. | 148/103 X |
| 4,298,405 | 11/1981 | Saus et al. | 148/253 |
| 4,601,765 | 7/1986 | Soileau et al. | 148/104 |

FOREIGN PATENT DOCUMENTS

| | | | |
|---|---|---|---|
| 0765891 | 9/1980 | U.S.S.R. | 148/105 |

OTHER PUBLICATIONS

The Condensed Chemical Dictionary, 10th ed, 1981, pp. 17, 102, 797, 798, 837 & 839.

*Primary Examiner*—Mary Lynn Theisen
*Attorney, Agent, or Firm*—Woodcock Washburn Kurtz Mackiewicz & Norris

[57] ABSTRACT

Methods of doubly coating iron particles. The methods comprise treating the iron particles with phosphoric acid to form a layer of hydrated iron phosphate at the surfaces of the iron particles. The particles are heated in an inert atmosphere at a temperature and for a time sufficient to convert the hydrated layer to an iron phosphate layer. The particles are then coated with a termoplastic material to provide a coating of thermoplastic material substantially uniformly circumferentially surrounding the iron phosphate layer. Doubly-coated iron particles provided in accordance with this invention are generally useful for forming magnetic components and cores for use in high frequency switching applications.

23 Claims, No Drawings

DOUBLY-COATED IRON PARTICLES

FIELD OF THE INVENTION

This invention relates to methods of coating iron particles with a first layer of insulating material and a second layer of thermoplastic material. More specifically, this invention relates to mixtures of such doubly-coated iron particles useful in molding high frequency magnetic components.

Backqround of the Invention

Insulated iron powders have previously been used in molding magnetic cores for use in magnetic components. By electrically isolating the individual iron particles from each other, eddy current effects are limited, thereby resulting in constant magnetic permeability over an extended frequency range. The magnetic permeability of a material is an indication of its ability to become magnetized, or its ability to carry a magnetic flux.

Previous uses of insulated iron powders have been limited to use of the particles in the compressed "green'"—but unsintered—state, because the sintering operation generally destroyed the electrical insulation between the magnetic particles by metallurgically bonding the particles to each other. However, because articles made from unsintered "green" particles lack strength, the types of molding techniques and magnetic components which could be created from the green insulated powder have been limited.

Attempts have been made to utilize a binder that would also serve as a partial insulating layer. Examples of this are epoxy-type systems, and magnetic particles coated with resin binders as disclosed in U.S. Pat. No. 3,933,536, Doser et al. Plastic-coated metal powders are disclosed in U.S. Pat. No. 3,935,340 to Yamaguchi et al. for use in forming conductive plastic-molded articles and pressed powder magnetic cores.

The iron particles disclosed in the aforementioned patents are not sufficiently insulated from each other to maintain magnetic permeability that is sufficicntly high for use in constructing magnetic cores having high frequency switching capabilities. Accordingly, Neither Doser et al. nor Yamaguchi et al. solve the long-felt needs in the art for iron particles that have not only high strength, but also high constant magnetic permeability over a wide frequency range.

In an attempt to decrease cor losses during alternating current (A.C.) operation, doubly-coated iron particles have been used. See U.S. Pat. No. 4,601,765, Soileau et al. The iron powders disclosed in Soileau et al. are first coated with an inorganic insulating material, for example, an alkaline metal silicate, and then overcoated with a polymer layer. Similar doubly-coated particles are disclosed in U.S. Pat. Nos. 1,850,181 and 1,789,477, both to Roseby. The Roseby particles are treated with phosphoric acid prior to molding the particles into magnetic cores. A varnish is used as a binder during the molding operation and acts as a partial insulating layer. Other doubly-coated particles which are first treated with phosphoric acid are disclosed in U.S. Pat. No. 2,783,208, Katz, and U.S. Pat. No. 3,232,352, Verweij. In both the Katz and Verweij disclosures, a thermosetting phenolic material is utilized during molding to form an insulating binder.

None of the aforementioned patents, which generally disclose doubly-coated iron particles for use in forming magnetic cores, solve a long-felt need in the art for doubly-coated magnetic particles which produce magnetic components having a high, constant magnetic permeability over a wide frequency range and good mechanical strength. In all cases, iron particle compositions used for these purposes in the past have required a level of binder or resin that is so high as to reduce the iron density, and therefore the magnetic permeability, to an unacceptable degree.

There thus exists a long-felt need in the art for iron particles which produce high permeability magnetic components over a wide frequency range. An additional long-felt need exists in the art for iron particles which can be used to form magnetic components having high A.C. switching capabilities. There is yet a further long-felt need in the art for electrically insulated particles that maintain a high strength after molding for forming high strength magnetic components.

SUMMARY OF THE INVENTION

The present invention provides a method of doubly coating iron particles to form a composition useful in the preparation of magnetic components having constant magnetic permeability over an extended frequency range. The method comprises treating the iron particles with phosphoric acid to form a layer of hydrated iron phosphate at the surfaces of the iron particles, heating the iron particles in an inert atmosphere at a temperature and for a time sufficient to convert the hydrated layer to an iron phosphate layer, and coating the particles with a thermoplastic material to provide a substantially uniform, circumferential coating of such material surrounding the iron phosphate layer.

Mixtures of doubly-coated iron particles for molding high frequency magnetic components are also provided in accordance with this invention. The mixtures comprise iron core particles having a weight average particle size of approximately 20–200 microns, wherein the particles have a layer of iron phosphate at their surfaces and a substantially uniform circumferential coating of a thermoplastic material surrounding the iron phosphate layer. In preferred embodiments, the thermoplastic material constitutes about 0.2% to about 15.0% by weight of the coated particles.

DETAILED DESCRIPTION OF PREFERRED EMBODIMENTS

Methods of doubly coating iron particles provided in accordance with this invention solve a long-felt need in the art for iron particles which produce both high strength and high constant magnetic permeability over an extended frequency range. While doubly-coated particles provided in accordance with this invention are particularly useful for molding magnetic components for use in high switching frequency magnetic devices, it will be recognized by those with skill in the art that these particles are generally useful in any application which requires reduced magnetic core losses. These advantages are accomplished by forming a thin insulative layer around each iron particle and efficiently utilizing a thermoplastic binder so that the particles can be easily molded into strong magnetic components.

The raw material for the doubly-coated iron powder provided in accordance with this invention generally comprises high compressibility iron or ferromagnetic particles, preferably having a weight average particle size of about 20–200 microns. An example of such powder is ANCORSTEEL 1000C available from Hoeganaes Company, Riverton, New Jersey. In preferred embodiments, the raw iron powder is treated with phosphoric acid in a mixing vessel to form a hydrated iron phosphate at the surface of the powder. In further preferred embodiments, the hydrated iron phosphate layer is obtained by mixing the raw iron powder in a mixing vessel with the acid. Typically, the acid is diluted in about two parts carrier, such as acetone, per part acid, to assure good dispersion of the acid around the particles.

The powder is then dried by removal of the acetone, providing a layer of hydrated iron phosphate at the powde surfaces. The powder is then cured by heating in an inert atmosphere at a temperature and for a time sufficient to convert the hydrated layer to an iron phosphate layer.

In preferred embodiments, the powder is heated during the curing step at temperatures ranging from 100° F. to 2,000° F., and more preferably in a range from 300° F. to 700° F. It will be recognized that the length of the heat treatment will vary inversely with the temperature, but generally the powder can be heated for as little as one minute at the highest temperature to as long as 5 hours at lower temperatures. Preferably the conditions are selected so as to dehydrate the iron phosphate layer over a 30–60 minute period. The curing step converts the hydrated layer to a glass-like iron phosphate, which provides good electrical insulation between the particles, thereby insuring that a high magnetic permeability can be achieved in magnetic components made from the final doubly-coated powder.

The weight, and therefore the thickness, of the phosphate coating level can be varied to meet the needs of any given application. Higher phosphorous content provides better insulation, resulting in better high-frequency properties. It is noted that the complete absence of a phosphate layer provides high permeability at lower frequencies due to inner-particle contact, but magnetic properties at high frequencies are reduced. The iron phosphate layer is preferably no greater than about 0.2% by weight of the doubly-coated iron particles, but can be less than about 0.001% by weight, depending on the particular magnetic core application for which the particles are intended After the phospating step is accomplished, the insulated particles are coated with a thermoplastic material to provide a substantially uniform circumferential outer coating to the iron phosphate layer. This coating can be accomplished by any method that uniformly circumferentially coats the particles with the thermoplastic material. In preferred embodiments, coating is accomplished in a fluidized bed process.

An appropriate fluidized bed to perform the coating step is the Wurster coater manufactured by Glatt Inc. During the Wurster coating process, the iron powder is fluidized in air. The designed thermoplastic material is first dissolved in an appropriate solvent and then sprayed through an atomizing nozzle into the inner portion of the WURSTER coater. The solution droplets wet the powder particles, and the solvent is evaporated as the iron particles move into an expansion chamber. This process results in a substantially uniform circumferential coating of the thermoplastic material around the iron phosphate layer on each insulated particle.

By using an appropriate fluid bed coating process on a minimal amount of thermoplastic material, a small amount of such binder material can be used. This achieves advantageous powder characteristics such as a high strength and the ability to mold magnetic components with a constant magnetic permeability over a wide frequency range. In preferred embodiments, a polyethersulfone is used as the thermoplastic material. An excellent polyethersulfone can be obtained from ICI Inc. under the name VICTREX PES. In other preferred embodiments, a polyetherimide can be utilized to provide the thermoplasti layer. A suitable polyetherimide is sold as ULTEM by the General Electric Company.

The doubly-coated iron particles that are prepared as described above can be formed into magnetic cores by an appropriate molding technique In preferred embodiments, a compression molding technique, utilizing a die heated to a temperature substantially above the glass transition temperature of the thermoplastic material, is used to form the magnetic components. For the preferred polyethersulfones and polyetherimides, the die is generally heated to a temperature above 500° F. The powder mixture is then charged into the die, and normal powder metallurgy pressures applied to press out the final component. Typical compression molding techniques apply powder metallurgy pressures in the range from about 5 to 100 tsi and, more preferably, in a range from about 30 to 60 tsi.

When compression molding is utilized to form magnetic cores in accordance with this invention, it is generally desired to provide sufficient thermoplastic material to provide a coating that constitutes from approximately 0.2% to 15.0% by weight, more preferably about 0.5 to 2.0% by weight, of the doubly-coated particles. Furthermore, when the iron phosphate insulating layer comprises less than about 0.001% by weight of the doubly-coated particles, the thermoplastic material alone can be utilized to reduce current losses. Peak radial crush strength values are achieved with about 1.0 to 1.25% thermoplastic material At levels below about 0.2 weight % thermoplastic material, there is not enough material to fill all of the voids present in the finished part, while at levels above about 1.5% to 15.0% by weight, pockets of air can become trapped during the pressing process. Both of these situations lower the radial crush strength.

The following table indicates the strength and density of doubly-coated iron powders (ANCORSTEEL 1000C) having various weights of thermoplastic materials without an insulating layer. It can be seen that the radial crush strength peaks at around 1% thermoplastic. This radial crush strength is significantly higher than the radial crush strength available from previous iron particles coated with other binders or resins. Thus, iron particles provided in accordance with the present invention solve a long-felt need in the art for iron particles having high radial crush strength for use in forming magnetic cores.

TABLE 1

| Material | Press. Temp. (°F.) | Density (gr/cc) | % Theoretical Density | Radial Crush Strength (psi) |
|---|---|---|---|---|
| Control (no thermoplastic material) | — | 7.33 | 93.4 | 15,567 |
| 2% PES | 500 | 6.87 | 96.5 | 32,000 |
| 1% PES | 500 | 7.32 | 98.1 | 44,100 |
| 0.75% PEI | 500 | 7.40 | 97.9 | 47,700 |
| 1.00% PEI | 500 | 7.25 | 97.2 | 51,600 |

TABLE 1-continued

| Material | Press. Temp. (°F.) | Density (gr/cc) | % Theoretical Density | Radial Crush Strength (psi) |
|---|---|---|---|---|
| 1.50% PEI | 500 | 7.13 | 97.9 | 44,500 |

An injection molding technique can also be applied from doubly-coated iron particles provided in accordance with this invention to construct composite magnetic products. These composite materials generally require a higher level of thermoplastic material and can be injection molded into complex shapes and around components of a finished part such as, for example, magnets, bearings, or shafts. The resulting part is then in a net-shaped form and is as strong as a reinforced version of the same part, but with the added capability of carrying a constant magnetic flux over a wide frequency range.

Generally, iron-core particles having a very fine particle size, for example, 10–100 microns, are used when injection molding will be used to form the magnetic component The finer the iron particle used, the higher the amount of iron that can be added and still form the part. A1000C may also be used to form the doubly-coated particle as well as A1000B or ATOMFLAME, all available from the Hoeganaes Company. Furthermore, if the final magnetic part will not be exposed to an A.C. field, for example, when the part will be used with a permanent magnet, the phosphate coating is not necessary.

In the preparation of doubly-coated powders intended for use in injection molding, thermoplastic material can generally be any conventional material, but is preferably a polyetherimide or polyethersulfone. The material is coated around the phosphate-coated iron powders using a traditional compounding system in which the thermoplastic material and iron particles are fed through a heated screw blender, during the course of which the thermoplastic material is melted and mixed with the iron as the materials are pressed through the screw. The resulting mixture is extruded into pellet form to be fed into the injection molding apparatus. This process can be used with most thermoplastics.

It is also possible to over-coat the phosphate-coated particles utilizing the fluidized bed approach, as described above. With both of the above-disclosed processes, up to 65 volume percent iron loading is possible. The resulting materials can then be injection molded into a finished part. When the doubly-coated iron particles are intended to be used in an injection molding process, it is generally desired to provide sufficient thermoplastic material to provide a coating that constitutes from about 8% to about 14% by weight of the doubly-coated particles.

In general, when the starting iron particles are about 50–100 microns in average size, the doubly-coated iron particles provided in accordance with this invention have a weight average particle size of about 50–125 microns. However, larger iron particles as well as iron particles in the micron and submicron range can be doubly-coated by methods provided in accordance with this invention to provide final powders of greater or less than this range. In any case, methods provided in accordance with this invention produce doubly-coated iron particles which have a good magnetic permeability over a wide frequency range and a high radial crush strength. The doubly-coated iron particles provided in accordance with this invention thus solve the long-felt needs in the art for iron particles which can be used to produce magnetic components, parts and cores having high magnetic permeability over wide frequency ranges and high frequency A.C. switching capabilities. The following table indicates the magnetic permeability at high frequencies for doubly-coated iron particles provided in accordance with this invention as comapred to 1008 steel at 0.030" gauge.

TABLE 2

| Frequency $kH_z$ | Doubly Coated Ancorsteel 1000C with a Phosphate Coating and 1% ULTEM Coating Pressed to 7.26 gr/cc Density | 0.030" 1008 Steel Lamination Stack |
|---|---|---|
| 0.1 | 78.46 Gauss/Oersted | 80.1 |
| 0.5 | 78.15 Gauss/Oersted | 68.9 |
| 1 | 78.12 Gauss/Oersted | 52.3 |
| 5 | 77.95 Gauss/Oersted | 17.0 |
| 10 | 77.83 Gauss/Oersted | 11.6 |
| 20 | 77.55 Gauss/Oersted | 8.0 |
| 50 | 76.73 Gauss/Oersted | 5.0 |
| 100 | 74.87 Gauss/Oersted | 3.6 |
| 200 | 69.55 Gauss/Oersted | 2.7 |

There have thus been described certain preferred embodiments of doubly-coated iron particles and methods of doubly coating iron particles. While preferred embodiments have been disclosed and described, it will be recognized by those with skill in the art that variations and modifications ar within the true spirit and scope of the invention. The appended claims are intended to cover all such variations and modifications.

What is claimed is:

1. A method of doubly coating iron particles comprising the steps of:

treating the iron particles with phosphoric acid to form a layer of hydrated iron phosphate at the surface of the iron particles;

heating the iron particles in an inert atmosphere at a temperature and for a time sufficient to convert the hydrated layer to an iron phosphate layer; and coating said particles with a thermoplastic material that is a polyethersulfone or a polyetherimide to provide a coating of said thermoplastic material substantially uniformly circumferentially surrounding said iron phosphate layer, wherein sufficient thermoplastic material is used to provide a coating that constitutes from about 0.2% to about 15.0% by weight of the doubly-coated particles.

2. The method recited in claim 1 wherein the coating step comprises:

fluidizing said iron particles in a gaseous stream;

contacting the fluidized iron particles with a solution of thermoplastic material to provide a substantially uniform coating of thermoplastic material around the iron particles; and drying the particles.

3. The method recited in claim 1 wherein sufficient thermoplastic material is used to provide a coating that constitutes from about 8% to about 14.0% by weight of the doubly-coated particles.

4. The method recited in claim 1 wherein sufficient thermoplastic material is used to provide a coating that constitutes from about 0.5% to about 2.0% by weight of the doubly-coated particles.

5. The method recited in claim 3 or 5 wherein the iron particles have a weight average particle size of 20–200 microns and the thermoplastic material is a polyethersulfone.

6. The method recited in claims 3 or 4 wherein the iron particles have a weight average particle size of 20–200 microns and the thermoplastic material is a polyetherimide.

7. A mixture of doubly-coated iron particles for molding high frequency magnetic components wherein said coated iron particles comprise:

iron core particles having a weight average paticle size of about 20–200 microns;

a layer of iron phosphate at the surface of the iron core particles; and a substantially uniform circumferential coating of a thermoplastic material that is a polyethersulfone or a polyetherimide surrounding the iron phosphate layer, said thermoplastic material constituting about 0.2% to about 15.0% by weight of said particles.

8. The coated particles of claim 7 wherein the thermoplastic material constitutes about 0.5% to about 2.0% by weight of the particles.

9. The coated particles of claim 7 wherein the thermoplastic material constitutes about 8% to about 14.0% by weight of the particles.

10. The coated particles of claim 7, 8 or 9 wherein the thermoplastic material is a polyethersulfone.

11. The coated particles of claim 7, 8 or 9 wherein the thermoplastic material is a polyetherimide.

12. The coated particles of claim 7 wherein the phosphate layer is no greater than about 0.2% by weight of the doubly-coated particles.

13. The coated particles recited in calim 7 wherein the iron phosphate layer is up to about 0.001% by weight of the doubly-coated particles.

14. A method of making high frequency magnetic components comprising the steps of:

(a) providing a mixture of doubly-coated iron particles comprising:

(1) iron particles;

(2) a layer of iron phosphate at the surface of the iron particles; and (3) a coating of a thermoplastic material that is a polyethersulfone or a polyetherimide surrounding the iron phosphate layer, said thermoplastic material constituting about 0.2% to about 15.0% by weight of said doubly-coated particles; and (b) molding the mixture of doubly-coated iron particles into a magnetic component having a density that is at least about 96.5% of theoretical density.

15. The method recited in claim 14 wherien the thermoplastic material constitutes about 0.5% to about 2.0% by weight of the particles.

16. The method recited in claim 14 wherien the thermoplastic material constitutes about 8% to about 14.0% by weight of the particles.

17. The method recited in claim 15 or 16 wherein the thermoplastic material is a polyethersulfone.

18. The method recited in claim 15 or 16 wherein the thermoplastic material is a polyetherimide.

19. The method of claim 14 wherein the iron phosphate layer is no greater than about 0.2% by weight of the doubly-coated particles.

20. The method of claim 19 wherein the iron phosphate layer is up to about 0.001% by weight of the particles.

21. The method recited in claim 15 wherein the molding step is a compression molding process.

22. The method recited in claim 21 wherein the compression molding process further comprises the steps of:

introducing said particles into a die;

heating the die to a temperature substantially above the glass transition temperature of the thermoplastic material; and applying a pressure of about 5–100 tsi to said particles in the die.

23. The method recited in claim 16 wherein the molding step is an injection molding process. thermoplastic material constitutes about

* * * * *

UNITED STATES PATENT AND TRADEMARK OFFICE
CERTIFICATE OF CORRECTION

PATENT NO. : 5,063,011

DATED : November 5, 1991

INVENTOR(S) : Howard Rutz and Francis G. Hanejko

It is certified that error appears in the above-identified patent and that said Letters Patent is hereby corrected as shown below:

Column 1, line 11; "Backqround of the Invention" should read -- BACKGROUND OF THE INVENTION --

Column 3, line 13; "powde" should read -- powder --

Column 4, line 9; "thermoplasti" should read --thermoplastic --

Column 5, line 23; after "component" insert -- . --

Column 6, in claim 5, line 65; "5" should read -- 4 --

Column 7, claim 7, line 8; "paticle" should read -- particle --

Column 8, claim 23, lines 38 and 39; the phrase "thermoplastic material constitutes about" should be removed.

Signed and Sealed this

Second Day of March, 1993

*Attest:*

STEPHEN G. KUNIN

*Attesting Officer* *Acting Commissioner of Patents and Trademarks*